June 28, 1932.   H. K. HARRIS   1,865,371
ADVERTISING DEVICE PUBLICITY TELEGRAPH, AND THE LIKE
Filed June 28, 1924   5 Sheets-Sheet 1
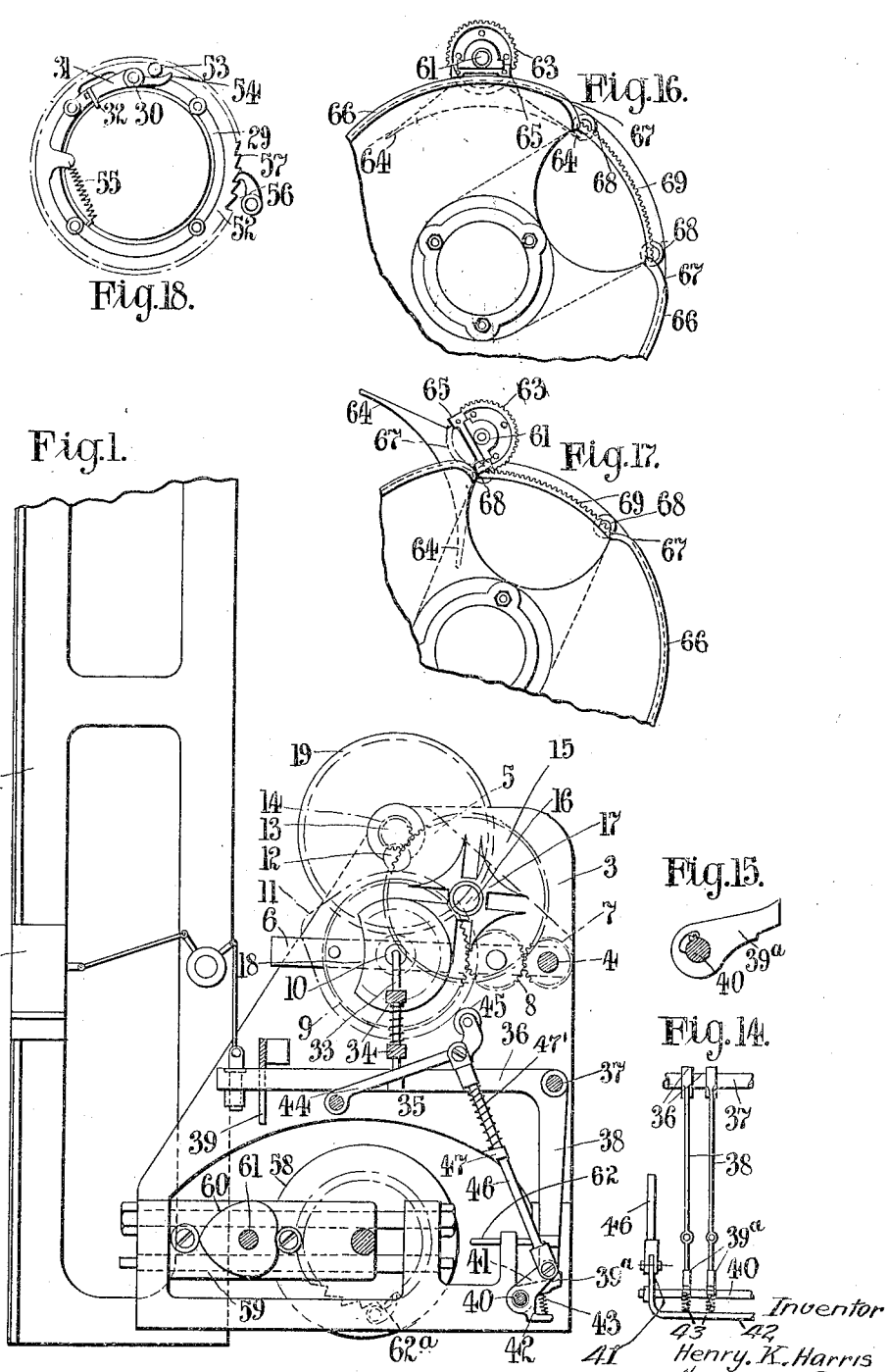

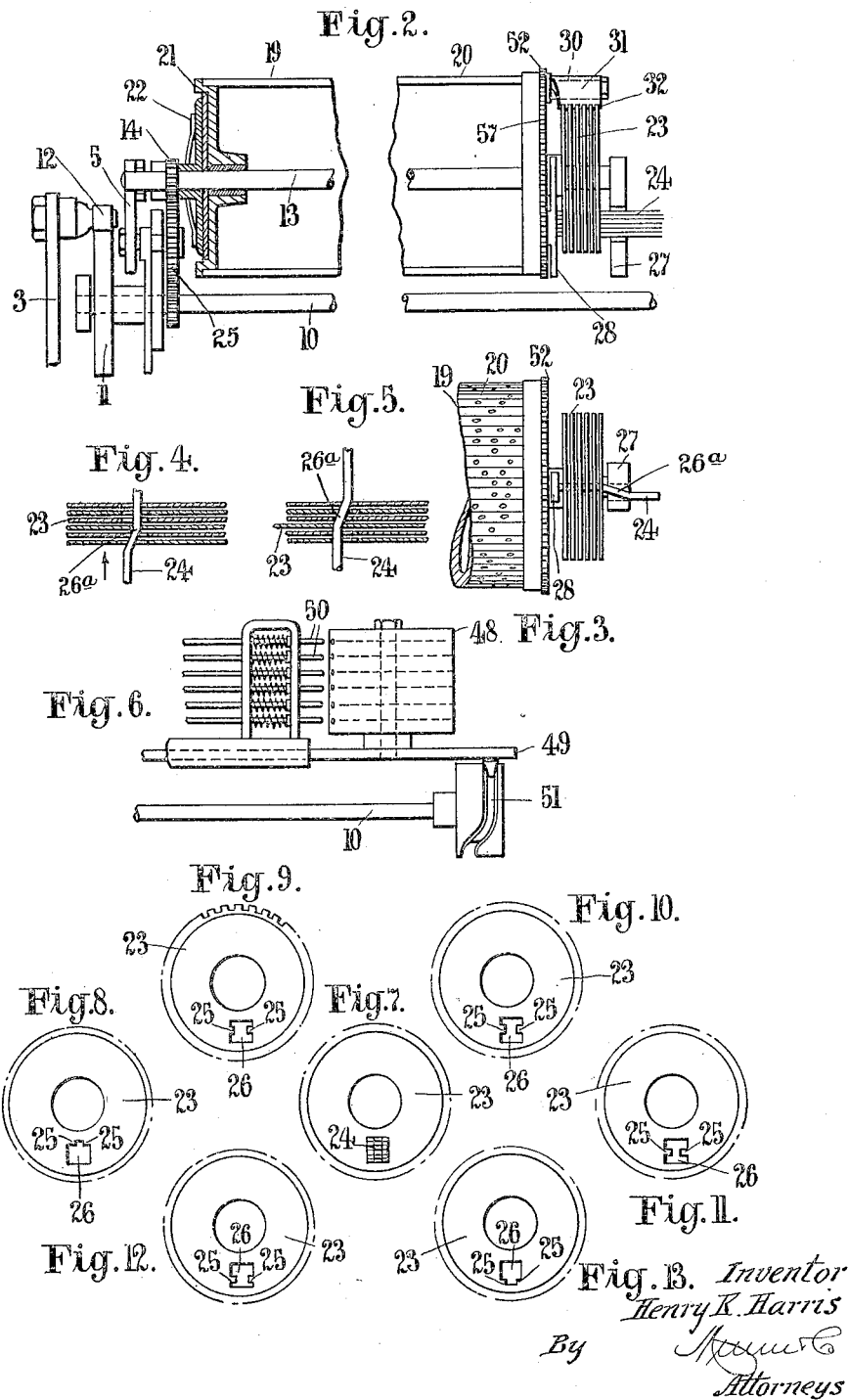

INVENTOR
Henry K. Harris
BY
ATTORNEY

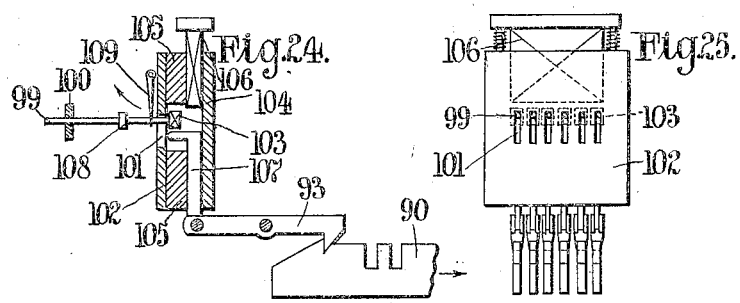
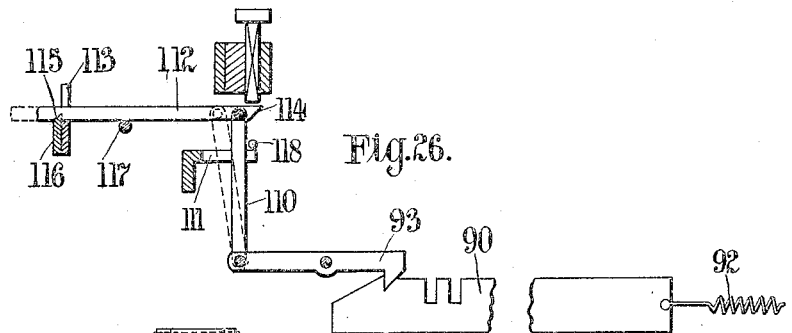
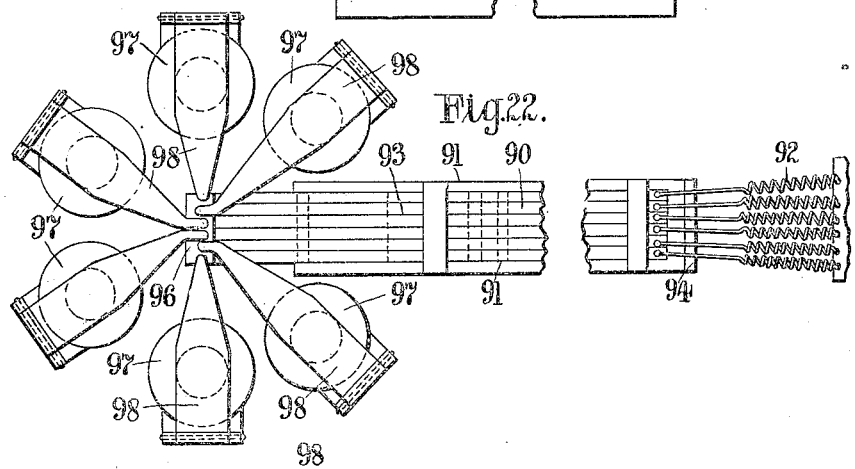
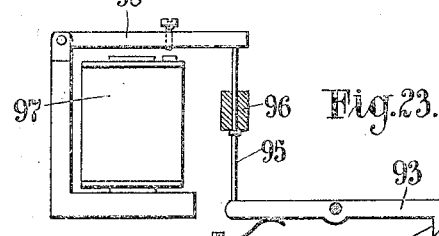

June 28, 1932.　　　H. K. HARRIS　　　1,865,371
ADVERTISING DEVICE, PUBLICITY TELEGRAPH, AND THE LIKE
Filed June 28, 1924　　　5 Sheets-Sheet 5
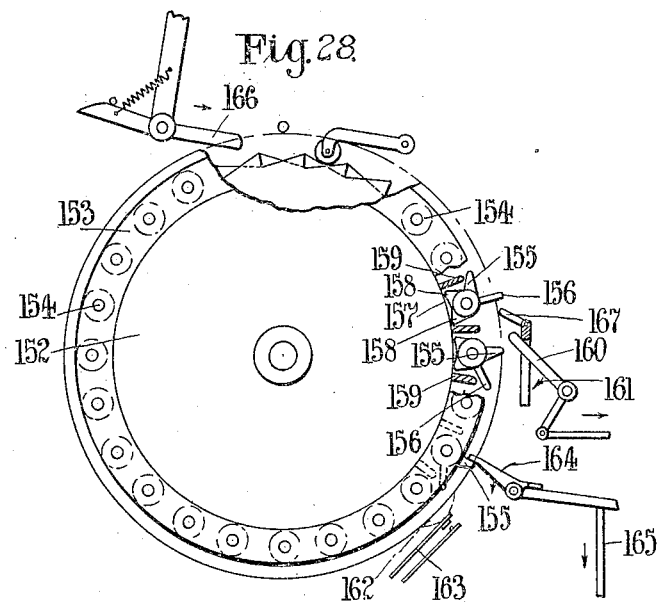
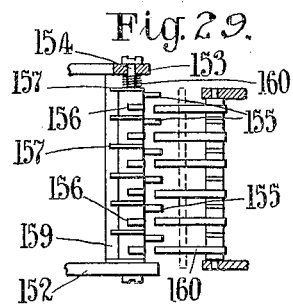
Inventor
Henry K. Harris
By
Attorneys Patented June 28, 1932

1,865,371

UNITED STATES PATENT OFFICE

HENRY KINGSFORD HARRIS, OF LONDON, ENGLAND

ADVERTISING DEVICE, PUBLICITY TELEGRAPH, AND THE LIKE

Application filed June 28, 1924, Serial No. 723,061, and in Great Britain August 23, 1923.

This invention relates to advertising devices, publicity telegraphs and the like of the type employing bands, flaps, slides, plates, discs, spheres or portions thereof, electric lamps or any other indicating devices, arranged in units or in banks of units, and has for its object to provide means for the better and more speedy controlling of the indicating devices or the elements thereof.

The invention relates especially to means by which the desired indication in the exhibiting unit may be selected; and where separate elements are employed to form the same, for instant composition into the indication desired.

In general devices according to the invention comprise what may be termed " permutation selectors " formed from a number of members or parts such as slides, discs or the like adapted to be set by any suitable means in various positions relative to each other and thus to variably control the positions which subsequently operated mechanism or parts are enabled to take up, which parts or mechanism determine in any desired manner the particular indication to be exhibited.

The position into which a permutation selector is set may determine either the particular indication of a series of indications to be exhibited or the particular element or group of elements of an indication to be exhibited, or it may operate a shift mechanism, or other movement of the complete installation. A permutation selector may be set into a great number of different relative positions depending upon the number of its members or parts and each of these positions corresponds to one of the complete cycle of indications, elements, or groups of elements or other movements.

The permutation determining parts of a permutation selector may be comparatively few say five, more or less and these capable of giving a great number of permutations or different relative positions. Constructional forms of the permutation selector may comprise groups of sliding bars with notches or teeth on a common level which notches or teeth form a common groove in all the bars, the position of the common groove varying with the bar or bars moved, and its position selectively controlling subsequently operated mechanism.

Where the permutation selectors are set by electrical impulses ordinary known standard telegraph apparatus can be employed for the purpose; for instance a tape may be punched at the receiving station to record the message and then passed through a distributor. This latter might for example be that form of distributor operated by the standard code of five permutation units and would be successively and automatically connected electrically to the slector or other device to be controlled in each indicating unit. The permutation parts forming the selector in the unit would be set for example electro-mechanically through suitable electro magnets and mechanism by the particular punchings on the standard tape then passing through the distributor and this setting would control the subsequently set and exhibited indication in the units. All the permutation selectors in all the units would successively be set and subsequently in the cycle of operations all the indications or the like, determined by the settings of the selectors, would simultaneously be exhibited. The successive switching of the distributor to successive units could be effected by certain particular punchings or groups of punchings in the tape causing a circuit or circuits to be broken and another or others established if required by means of a relay, to operate a unit switch. In a similar manner if desired various banks of units could be switched successively into the main operating circuit.

In some cases a storage device may be employed, which will allow a large number of messages say thirty or forty to be stored in the parts actuating the permutation selector. The separate messages could be transferred to the selectors and then deleted or repeated in a cycle as long as required and then deleted and a new set recomposed. The storage system is most conveniently worked in conjunction with a code system preferably a standard code system.

The invention in addition to the foregoing, further comprises, various constructional arrangements and methods of operation to be described in the accompanying drawings which are given by way of example only and in a simplified manner for example for ease of comprehension.

In the drawings:—

Fig. 1 is a fragmentary sectional side elevation of the lower portion of an advertising unit constructed according to the invention.

Fig. 2 is a fragmentary sectional rear elevation of the upper jacquard and the permutation selector of the form of the invention shown in Fig. 1.

Fig. 3 is an exterior plan view with parts removed of the right hand end of Fig. 2.

Figs. 4 and 5 are diagrammatic sectional plans to illustrate the working of the permutation selector.

Fig. 6 shows plan of one method of setting the selector.

Fig. 7 shows an end elevation of the form of permutation selector detached shown in Figs. 2 to 5.

Figs. 8 to 13 show the various parts of the permutation selector.

Fig. 14 shows a rear elevation of a portion of Fig. 1.

Fig. 15 shows an enlarged detail of a form of catch employed.

Figs. 16 and 17 are two fragmentary views of gearing suitable for driving the unit shown in Figs. 1 and 2.

Fig. 18 shows a detail view of the part which is selectively set by the permutation selector shown in the previous figures.

Fig. 22 is a plan view of an electro magnetic permutation selector.

Fig. 23 is an elevation of a portion of Fig. 22.

Fig. 24 is a sectional side elevation of a mechanical relay combined with a permutation selector.

Fig. 25 is an elevation of a portion of Fig. 24.

Fig. 26 is an illustration of another mechanical relay permutation selector.

Fig. 28 shows a fragmentary diagrammatic plan of one form of composing and storage device for a number of messages.

Fig. 29 shows an elevation of a detail of same.

Figure 19:
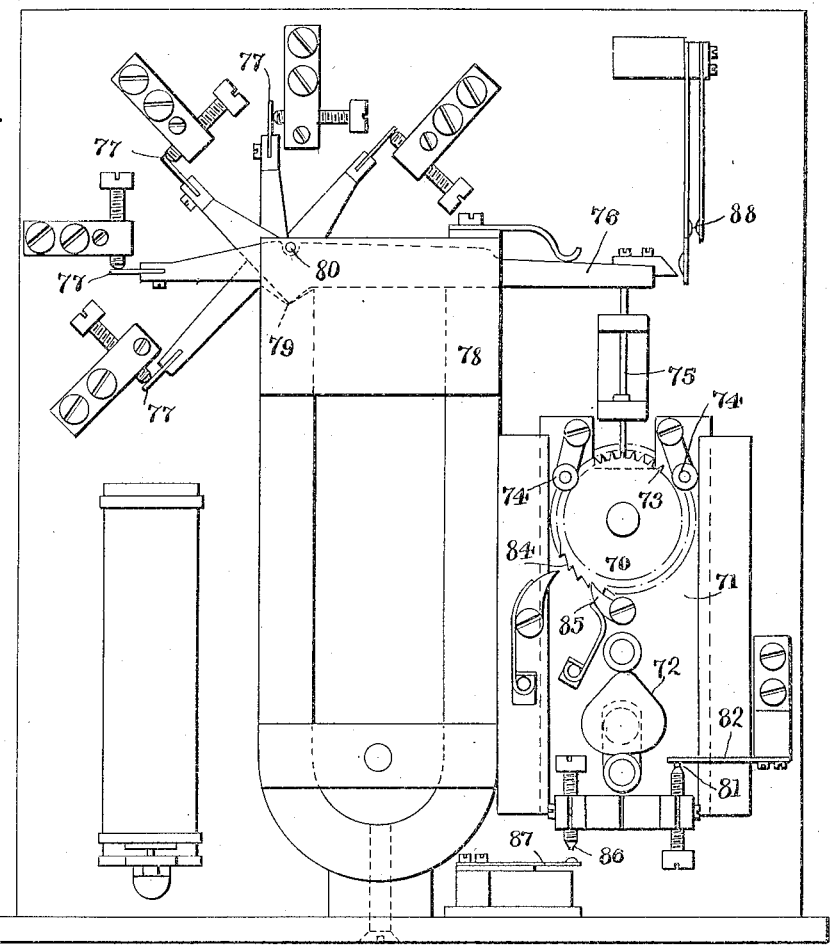
Fig. 19 is a front elevation of one form of electrical distributor for operating the permutation selectors from a punched tape.

The various forms of permutation selectors shown have parts each adapted to positively move or to be released to move, through one step and according to the part or parts moved through this one step so the whole permutation of relative positions of the parts may be gone through. Grooves, teeth, notches apertures or the like suitably disposed on the parts, by their combination give various positions which can be taken up by a latch or main pawl or the like whose position controls the subsequent mechanism.

Although only one step is generally moved by each of the parts of the selectors it is obvious that each part or some of the parts might in some cases have more than one step thus increasing the permutation range.

Referring to Figs. 1 to 18, 1 is the side frame of a unit made up by another side frame and base and top and if desired provided with an enclosing cover. The unit carries in suitable positions at the front thereof elements 2 of any suitable nature and to any suitable number. These form the elements of a monogrammic device or field of elements which are employed in the unit. The side plates 1 carry bracket plates 3 (Figs. 1 to 4) which support a main shaft 4, between them. The shaft 4 passes loosely through side frame plates 5 of a pivoted carriage 6. The gear 8 meshes with a gear wheel 9, on a spindle 10 also carried by pivoted carriage 6. The spindle 10 carries a cam 11 which runs in contact with a fixed roller 12, carried by the side plate 3. A spring (not shown) keeps the carriage 6 in its upper position with the cam 11 pressed against the roller 12 (although in some cases the cam may be a grooved cam and engage over the roller, when a spring will not be required) 13 is a shaft mounted between the frame plates 5. The shaft 13 has a gear 14, meshing with a gear 15, carried by a spindle 16 on a side frame plate 5. The spindle 16 carries a Geneva idler 17 which co-operates with its driver 18 carried by the spindle 10. It will be seen that the shaft 14 is only rotated to a required extent (about 480°) periodically at other times being at rest; and that the side plates 5 and carriage 6, which move downwards periodically under the action of the cam 11 take with them the shaft 13.

A jacquard roller 19 made up from longitudinal and apertured strips 20 and end plates 21 is mounted loosely on the shaft 13. A spring pressed friction clutch 22 is provided adjacent the gear 14 to ensure that the jacquard roller 19 rotates with the shaft 13 until it is prevented from doing so.

Mounted loosely on an extension of the shaft 13 are a number of discs 23, which form the parts of the permutation selector and are shown detached in Figs. 8–13. Each disc is provided with notches or teeth around its periphery so disposed that a groove can be formed extending across all of the discs, and that this groove comes in different angular positions according to whether any one or more of the discs 23 is moved. Each disc can be moved through substantially the same small angular distance in the same direction by the means to be hereinafter described. 24 are push bars one for each disc 23. Each bar 24 fits between projections 25 in apertures 26 in its particular disc 23, the projections 25 coming at different distances from the centre on the different discs 23. The push bars 24 are formed as longitudinal cams at 26ª and the slope 26 on each bar 24 comes adjacent its projections 25. The gaps or apertures 26 accommodate all the bars 24 which slide in guides 27 and 28. By pushing a bar 24 in the direction of the arrow (Fig. 4), it will rotate its discs 23 through a slight angle as shown in Fig. 5, without disturbing the other discs 23.

One or more of the rods 24 are moved by any suitable means such for example as by electro magnets and suitable mechanism and this causes the changing groove lying across all the toothed discs 23 and formed by a line of coincident notches between the teeth to come into a certain angular position. This position determines the angular position which the jacquard will take up as will now be explained.

29 (Fig. 18) is a ring flange fixed to the jacquard drum at one end. This carries a pin or fixed axle 30 for a pawl 31 formed with a latch 32 adapted to ride on the peripheral surfaces of the discs 23. A spring may be placed around the pivot 30 to keep the latch 32 pressed against the discs 23. The ring 29 rotates with the jacquard 19 and thus when the permutation discs have been set by the push rods 24, and in the cycle of operations the jacquard is rotated, then the latch 32 passes over the cylindrical surface formed by the discs 23 until it comes to coincident notches therein forming a groove, when the latch enters the groove. This locks the jacquard to the discs 23, which are held from rotation by the bars or rods 24 and the jacquard is prevented from having further movement. The remaining angular movement of the shaft 13 is permitted however by slipping in the friction clutch 22. The jacquard 19 has thus been brought into a certain desired position by the particular setting of the permutation selector. 33 are pins arranged in a row to a desired number mounted to slide in guide bars 34 and kept pressed upwardly by springs and stops. The upper ends of the pins come a short distance from the surface of the jacquard 19 and with the cam 11 rocking downwards the carriage 6 carrying the side frames 5 and the jacquard 19, the particular row of operative perforations in the jacquard pass over certain pins 33. At the places in the row of perforations on the jacquard where there are no perforations however the surface of the jacquard in moving downwards presses particular pins 33 downwards against the action of their springs.

36 are the upper arms of bell crank levers arranged on a common spindle 37. With these upper arms the pins 33 engage at 35, one pin with each arm. The arms 36 are guided and spaced by a comb plate 39 and each is connected through suitable link and lever means as shown in Figure 1 with its associated element 2. The lower ends of the arms 38 are formed as noses each of which is engaged by a spring catch 39ª mounted on a common shaft 40 with a certain amount of lost motion as shown in Fig. 15. 41 are levers fixed at each end of the shaft 40 which also carry a transverse rod 42, between them. This rod supports one end of each of the compression springs 43 for the spring catches 39ª. 44 is a lever pivoted to the framework 3 and carrying a roller 45 adapted to be operated by the cam 11. The lever 44 has connected thereto one end of a link rod 46 sliding in a guide 47 and kept pressed upwardly by means of a spring 47'. The other end of the rod 46 is connected to the lever 41.

When the jacquard 19 forces down certain pins 33 they rock their particular bell crank levers and operate the particular elements to which they are connected. They also cause the arms 38 thereof to force down their catches 39ª without moving the spindle 40 (this is permitted by the lost motion device). The noses of the arms 38 come on the other sides of the catches which again spring up and hold the arms 38 in the outer position and consequently the arms 36 in the lower position. The actuated elements are thus held in the exhibiting position as stated and the jacquard in the cycle of operations is free to move upwards under the action of the return spring or cam as the case may be.

At a time arranged in the cycle the cam 11 depresses the roller 45 and thus through the intermediary mechanism turns to a certain angular extent the shaft 40 which takes with it the whole of the catches 39ª and releases the arms 38 which have been held. The bell crank levers then resume their normal positions and the depressed pins 33 are raised. At the same time the previously operated elements 2 are restored to their normal positions.

The jacquard 19 in the foregoing description can be turned to any angular position according to the setting of the permutation selector. In some cases the permutations may be set in a desired sequence or series after which they repeat the said sequence.

One method by which this may be effected is to operate the push bars 24 by a small jacquard roller such as 48 mounted upon a slide 39 and caused to move towards and away from spring pressed pins or bars 50 suitably connected to the push bars 24, by a cam 51 on the shaft 10. The jacquard 48 may be built up from apertured strips and the disposition of the apertures and blanks between determines the particular setting of the push bars 24 and consequently the permutation discs 23 which in turn control the position subsequently to be taken up by the latch 32 the jacquard being rotated step by step in the action by suitable ratchet and pawl or other gearing.

Upon the upward movement of the jacquard 19, the latch 32 is disengaged from the discs 23 by the following mechanism. 52 is a ring mounted around the flange 29 so as to turn thereon. This ring 52 carries a projecting pin 53 which co-operates with a tail 54 of the pawl 31. 55 is a tension spring between the ring 52 and the flange 29. The disposition and arrangement of the parts is such that a small movement in a clockwise direction (Fig. 18) of the projection 53 relative to the flange 29, forces down the tail 54 and raises the latch 32 from engagement with the discs 23. 56 represents a suitably disposed spring pressed pivoted pawl mounted on the framework 3 which pawl engages with ratchet teeth on the periphery of the ring 52. On the upward movement of the jacquard 19 therefore the ratchet teeth 57 engage with the pawl 36 and the movement continuing the ring 52 is relatively rotated to cause the projection 53 to force downward the tail 54 to disengage the latch. Immediately however the jacquard 19 is turned in a clockwise direction (Fig. 18) for resetting into another position the tail 54 leaves the projection and the latch 32 is free to enter the differently positioned groove under the action of its spring. A separate repeat jacquard actuating device may in some cases be combined in each unit as previously described. This device in one form consists of a built-up jacquard roller 58 each apertured strip of which controls a desired indication or arrangement of elements 2, the strips being mounted in succession around the cylindrical periphery to give the required sequence. The axle of the jacquard roller 58 is carried by suitably mounted slides 39 whose movements are controlled by periodically rotated cams 60, on a driving shaft 61. A row of pins 62 similar to 33 have their free ends closely adjacent the surface of the jacquard roller 58. These pins can slide in a suitable guide and are connected to the arms 38 as shown. The jacquard roller 58 is reciprocated against the pins and on its return is turned through one angular division by a pawl and ratchet action 62ª, the pawl being on the framework. The shaft 61 may be driven by a modified geneva gear similar to that shown in Figs. 16 and 17, the shaft 61 carries the part pinion 63, horns 64 and saddle piece 65 all forming the idler, whilst the driver is a disc with a plain periphery 66 for the greater part of its circumference on which the saddle piece 65 rides. The plain periphery ends in two cam parts 67 joined by a toothed segment 69 having at the rear two projections 68 co-operating with the horns 64. The driving disc is constantly rotating in a clockwise direction (Figs. 16 and 17) and whilst the plain periphery 66 is passing under the saddle 65 the shaft 61 is at rest. When a projection 68 comes against a horn 64 the saddle is rocked over and slides down the cam 67 which is shaped and disposed for the purpose see Fig. 17. This brings the pinion teeth 36 into gear with the driving segment and in the continued rotation of the driving disc the shaft 61 makes a complete revolution.

With the combined arrangement shown in Fig. 1, the main driving shaft is connected by suitable gear or clutches with the two shafts 4 and 61, in such a manner that when the main shaft drives in one direction one shaft say the shaft 4, is driven, whilst when the main shaft drives in the opposite direction the shaft 61 is driven. In some cases a particular setting of the permutation selector may operate suitable means to bring the additional repeating device into operation and another setting to bring it out of operation.

As previously explained ordinary known standard telegraphic apparatus can be employed when working with electrical impulses and in the preferred form a tape is punched at the receiving station to record the message, which tape is automatically passed into a suitable distributor. A preferred distributor is that which is operated by the standard code of five rows of perforations, which distributor is in turn connected to the various units to pass on to the permutation selectors therein the various settings according to the punchings of the tape, the settings corresponding to the letters, signs or other indications and spaces which comprise the message, advertisement or the like. The distributor as the letters of the code pass through it sends either consecutively or simultaneously impulses which operate through suitable means the permutation selectors, the distributor also preferably controls circuits by which it is successively connected with the various banks of units and successively and individually with the separate units therein.

Figure 21:
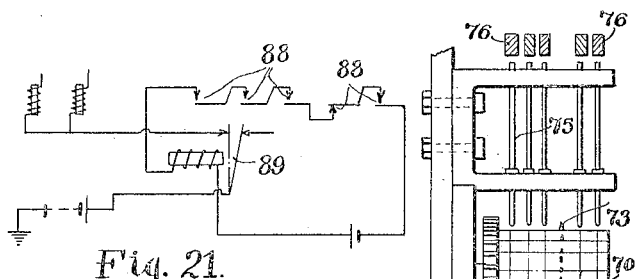
Fig. 21 is an electrical diagram of the connections of the distributor to illustrate the "shift" or switching into circuit of successive units.
Figure 20:
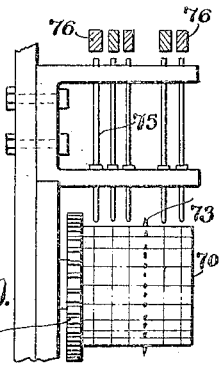
Fig. 20 is a side elevation of a portion of Fig. 19.

One form of distributor is shown in Figs. 19 and 21 for retransmitting and recording a tape message, this comprises a tape feed wheel 70, mounted on a slide 71, caused to reciprocate by a cam 72 mounted on a shaft passing through a slot in the slide. The tape is punched transversely and is fed over the wheel 70, by the pins 73, thereon engaging with the feed perforations in the tape and passes beneath the spring pressed guide rollers 74, mounted on pivoted arms. 75 are five needles the lower ends of which come on the tape. As the wheel carrying the tape is pushed towards the pins the latter pass through any suitably disposed perforations into depressions in the wheel but if a pin comes against the tape it is raised and raises its associated lever 76 and breaks the contact 77 controlled by the lever 76. The contacts 77 are arranged radially around the pivot formed by a knife edge fulcrum 79, of the levers which levers 76 are in the form shown of magnetic material and arranged over the poles of a permanent magnet 78. The contacts 77 are normally closed or in other words the pins 75 which pass through perforations in the tape have their associated contacts 77 kept closed. 80 is a transverse pin for holding the levers 76 in position. The contacts 77 are in the circuit of the magnets controlling the permutation parts of the selectors (such for example as those which will be described with reference to Fig. 22), in the units or of relays corresponding thereto but they do not directly make and break the circuit.

The circuits of the contacts 77 and selector actuating magnets are made and broken by a contact screw 81, on the slide 71 which makes contact with a spring arm 82 at the top of the slide movement, or instead of this by a timing cam rotated by the driving mechanism and having adjustable means for varying the length of contact.

The feeding of the tape wheel 70, is effected by the spring pressed pawl 83, on the guide actuating the ratchet wheel 84. 85 is a detent.

The successive units are switched into circuit by means of a unit switch operated step by step from the contact making screw 86, and spring contact arm 87 on the down stroke of the slide 71 or this switching may be effected by an extra contact in the tape.

A space left on the tape in one manner of working corresponds to a blank in the code and the permutations parts are so arranged that normally operating without any previous disturbance of the magnetic elements they cause a blank setting. Thus when the message is coded in the tape, if this is done with regard to the number of units in a line, not putting more words than allowable in a line, the balance of units left over will be automatically blanked, by the contacts 86 and 87 during the movements of the slide 71.

If desired the adjustable counting device may be added to the distributor to stop the driving motor at the end of each cycle of setting, that is when all the units have been set or this may be done from the actuating station.

It is to be observed that the five standard code employed allows of 32 permutations. These can be doubled whether by the use of a shift mechanism in the jacquard or by the use of an extra permutation disc or like device making six instead of five.

The former system when a jacquard is used, requires a longer jacquard which can be arranged to be shifted by the power in the same way as the power setting of the permutation discs, but it is more convenient to make the jacquard of larger diameter when a drum is employed and use say a figure shift in the permutation discs and this enables the 5 standard code to be retained.

Figs. 22 and 23 show views illustrating a magnetic and escapement operated permutation selector. 90 are the permutation parts consisting of bars or strips with teeth or notches at one surface. They are arranged side by side and work between guides 91 each has connected to one end a tension spring 92 held against movement by a pivoted catch 93, engaging in suitable recesses by hook portions. 94 is a stop for limiting the movement of the permutation bars 90. 95 are pins sliding in a guide 96. A number of electro magnets 97 one for each bar 90 is arranged around the pins 95, with the hinge armatures 98 pointing inwards and shaped at their ends each to come above and rest on one pin 95. When an electric impulse passes around an electro magnet 97 for instance from the distributor its armature is attracted. This pushes down its particular pin 95 which in turn disengages the hooked end of the lever 93 from the bar 90 and allows the bar to "escape" under the action of its spring 92, until it comes against the stop 94. According to the bar or bars 90, released by that magnet 97, so the position of the common groove formed by the notches in the upper surface of all the bars varies. The positions of this groove control the setting of the subsequent mechanism.

Figs. 24 and 25 show what may be termed a mechanical relay in which pins 99 are moved by the magnets or the like from the distributor or otherwise. The pins 99 work in a guide 100 and enter slots 101 in a common plate 102. Each pin 99 has a squared head 103, located in a recess behind the plate 102. 104 is another plate connected to 102, with fillet pieces 105, between. 106, is a flat rectangular "hammer" periodically reciprocated up and down at a certain phase in the cycle of operations in an indicating unit and kept pressed up by springs. Below the hammer 106, with a certain gap between, are arranged a number of L shaped "anvils" 107, adapted to slide in the casing and connected at the lower ends to lever catches such as 93 co-acting with escape operated permutation bars 90. The square heads 103 come on the upper surfaces of the anvils. If no pins 99 are moved, then the hammer 106, moves down without operating the anvils to release the catches but if one or more pins 99 are operated then the squared heads form connecting parts between the hammer and the particular anvils and upon the descent of the hammer, these anvils are pushed down and raise the catches 93 to release the bars 90, corresponding to the pins 99 which were operated. 108 are stops on the pins to limit their action and 109 is a pivoted comb plate which co-operates with the stops 108, to reset the pins 99 for which purpose it is periodically moved in the direction of the arrow at a suitable phase in the cycle of operations.

Another form of mechanical relay for the operation of the permutation parts is shown at Fig. 26. In this form the lever catches 92 are connected to links 110 which are steadied in a comb plate 111 and connected at their upper ends to rods 112 which pass through a comb plate 113. The forward ends 114 of the bars 112 in the connecting positions come beneath the hammer 106, whilst in the other position the hammer action is ineffective. Each bar 112 is provided with a notch 115, which takes over a knife edge 116, when the rod is pushed forwards. 117 is a rod running beneath the bars 112 and 118 is a rod running behind the links 110.

The action of this form is as follows: when the bars are in the left hand position, that is when the links 110 come in the dotted positions, then the hammer moves up and down without coming into contact with the end 114 of the rods 112. When however one or more of the bars are moved forwards, their ends 114, come beneath the hammer and upon the descent of the hammer the links 110 are forced downwards freeing the lever catches 93 and allowing the particular notched permutations bars 90 to move under the action of their springs 92. As the ends 114 of the bars 112 are forced down by the hammer, these bars rock on the rod 117, as a fulcrum and free the notches 115 from the knife edge 116, which action allows the bars under their spring control to return to the unset position, when the bar 118 is moved to the left and forces the links 110, in that direction. The mechanical relays allow a light delicate movement to set the rods beneath the hammer or the like, whilst permitting ample local power to be used to release or positively set the parts of the permutation selector.

Figure 27:
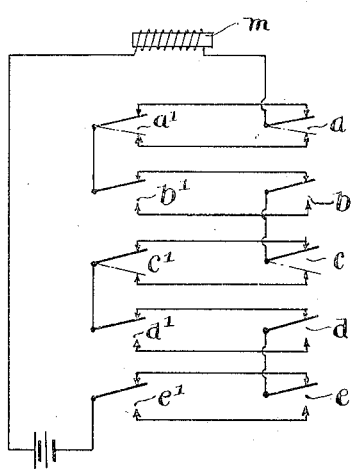
Fig. 27 shows an electrical diagram of a permutation selector formed by a group of relays interconnected through a multi-position switch in an actuating circuit, and adapted to be set in various relative positions to effect the required selection.

The following is an example of a permutation of five on this system and Fig. 27 is a diagram of connections. $a$ to $e$ are five relays with contacts which can be set in any combination from a distributor or otherwise or they may be spring or mechanically controlled contacts each capable of being in one of two positions according to the setting carried on a composing or storing machine. $a^1$ to $e^1$ represent the corresponding contacts made by the cam, commutator or like device. It will be noted from an examination of the circuit that this is only complete when both sets of contacts correspond.

Thus if a given set of contact permutations are set up on $a$ to $e$ that is the commutator and brushes (or a cam wheel and contacts form a like permutation corresponding to the contacts $a$ to $e$) thus when the commutator or like device is rotated will be brought about in one particular position only corresponding to the contacts $a$ to $e$. In the circuit is a magnet $m$ which on being energized releases a catch or like device which immediately locks the selector in the position which it then occupies, or otherwise determines its stopping, whether the wheel be driven or escaped. Such a device is especially suited for the setting of selector movements of other type. It may also be employed to directly determine the setting of an element composing jacquard or the like or the indication carrying members without the use of the independent selector, where the selector is set prior to the setting of the indication carrying member or members. It may form a selector which is geared to or otherwise arranged to run in connection with a jacquard or the indication carrying member itself. Thus for instance in the case of an indication carrying member consisting of a band or bands, the parts controlling them can be geared or otherwise arranged to run so that they move in unison with a coupled selector wheel of the type above described, each indication as it passes the setting position corresponding to the formation of its corresponding permutation by the brushes, as the commutator at the corresponding point passes beneath them. The circuit as previously described will be closed when this permutation corresponds to that which has been set upon the determining contacts $a$ to $e$. Thus the band or corresponding device when the magnet $m$ is actuated will be stopped and locked in the desired position. Further the movement can be run in either direction the coupling of the part to be set to the device being by friction, mechanical, electrical, clutch or motor or pneumatic or other means and the device can be combined with any suitable devices with the pneumatic or other devices described in this specification. Thus by this combination a band with indications in a unit can be caused to move directly from the last to the new setting position if desired without any necessity to zero either the selector or the band bearing the indications.

The control movement of this selector may be likened to a mechanical lock in which the key is formed of the permutation setting $a$ to $e$ and the lock $a^1$ to $e^1$ and the key will only actuate the right permutation.

For a large number of permutation settings a shift may be employed in the above which may shift the commutator or the brushes or the like or a larger number of permutation elements may be used, but a shift is preferred so as to keep the system in accordance with telegraph practice. When it is required in this connection the control of the shift is effected as before described.

When the above movement in the unit is controlled from a relay group this latter may be common to all the units and connected thereto by a series of common lines the return circuit passing through the unit and bank selectors so that the relay group can be switched into each unit in succession as they are set as previously described. In this way a relay group can be used to set the units in the usual manner (when the selectors are employed in the units) directly from the transmitting station.

The above setting devices may any of them be positively driven in types of machines where this is preferable, the selectors may also be coupled to a common drive by friction slip or otherwise, and in some cases placed separate from the units they control and connected thereto electrically.

Referring to Figs. 28 and 29 the storage system here shown comprises a wheel 152, supporting a ring 153 parallel to it, the wheel and ring being connected by a number of equally spaced screw pins 154. On each of these pins 154 are arranged groups of six cams 155. Each cam comprises the cam proper and an actuating tail 156, which comes at a different level. Between adjacent cams shaped washers 157 are disposed prevented from rotating on the pins by projections 158 engaging the distance members 159. These distance members divide the structure into a number of cells one for each group of cams. In some cases the wheel 152, the ring 153 and the distance members 159 may be formed from one casting. 160 is a compression spring on each pin 154. This helps to hold the cams in the position in which they are set and prevents their being shifted by centrifugal or other displacing tendencies and counteracts wear. The lugs or tails 156 for setting are shown in front, but may be at the back which is convenient for the second type of storing machine in which the setting movement is kept inside the wheel. At a point around the circumference of the wheel is fixed a set of composing magnets pistons or like means which are capable of setting up any desired combination on any set of cams which form permutation parts which lie in front of them at each step in the rotation of the supporting wheels.

The setting magnets control a number of levers 160, the ends of which are adapted in one position to be brought into the path of the tails 156, which normally project from the wheel. When however a lever 160 is moved in the direction of the arrow Fig. 36, then its outer end comes in the path of the corresponding tail 156. On the continual rotation of the parts in an anticlockwise direction the lever trips the tail and brings the cam into operative position that is projecting from the wheel. Prior to each timed movement of the wheel the levers 161 are set for instance from a distributor. When the wheel is moved the particular cams in this position are set. The setting of the cams in each group continues until the wheel is composed, when a cam 162 on the base of the wheel operates contacts 163 to send a signal to the transmitting stations indicating the wheel is fully composed. In the drawing the cam 162 and contacts are shown at the side for the sake of clearness.

164 are levers co-operating with the cams 155, by which the setting of the cams is transferred to the indicating element or group of elements, operating devices or to the main permutation selector. Each lever 163 controls a relay or other rod 165 for effecting the desired setting. The levers 164 are arranged in a group similar to the levers 161, but these levers come in different planes so that the tails 156 do not contact with the levers 164 or the cams 155 with the levers 161.

The permutation on the wheel is thus transferred to the permutation selector either directly or through a mechanical relay as before described. The permutation composing magnets are operated as before described by the setting means and they can in one form be so arranged that they either set up permutations for storage on the composing device or set the permutation selector directly either by using a separate set of magnets or a change over mechanical device. At each permutation or sequence setting of the composing device the wheel is moved round one step in an anticlockwise direction by means of a solenoid or piston with an engaging pawl operating a set of ratchet teeth and when the whole or an arranged part of the setting cams of the wheel have been set a signal is transmitted to the sending station by the cam 162, engaging contacts 163, which light a lamp, lock the transmitter or give some other arranged indication that the complement has been completed. If it is desired to correct or alter any permutation setting then this is done by a second ratchet wheel with reverse teeth and another feed pawl 166 and solenoid or piston. This is placed first in front of the composing movement so that a mistake detected in setting can be immediately corrected the same action of moving the wheel back deletes the permutation by resetting the cams. This is effected by a rocking comb and cam plate 167 which is free to rock for the cams to pass under it in the normal composing direction, but which when that direction is reversed engages any that have been set and pushes them home.

The transfer of the settings on the composed wheel takes place one at each cycle of the indicating unit, this is effected by the power, pneumatic or other, moving the composed wheel one step in an anticlockwise (in this example) direction where it remains until moved again on the next change of the units. This movement causes the operative cams of the particular permutation set which are opposite to them to depress any of a set of levers mounted in guide combs at the operating point and these either are arranged to engage the holding escapement catches of the permutation selector directly or to set an intermediate mechanical relay as before described, or of course they may set the permutation bars positively.

The repeat action can be arranged to continue normally until this is stopped on the transmitting station desiring to put up some other announcement such as telegraph news. The change over can be effected by a reversal of the current which actuates a polarized movement in the common circuit of the control and causes the setting of the permutation selector to be directly from the transmitting station and the repeat action to be cut out.

Though it is considered the above pattern is more useful generally for the purpose required, in some instances it may be useful to compose and transfer the permutations from the composed wheel while doing so. In this form the composing device is arranged so that it can be composed and deleted while the indicator unit is working and controlled by it except when the composing wheel is being moved.

Finally although many forms of advertising devices made according to the invention have been described, as well as particular methods of operation it must be understood that the invention is not in any way limited thereto as it may be carried into effect in many ways without departing from the spirit and scope thereof.

What I claim and desire to secure by Letters Patent in the United States of America is:—

1. In an apparatus of the character described, a plurality of visual indicating elements capable of being selectively assembled, a permutation selector comprising a number of parts capable of being arranged in various ways to produce different settings of the parts, means whereby the different settings of the permutation selector may be employed for selectively operating the indicating elements, and mechanical relay means for setting said selector.

2. In an apparatus of the character described, a permutation selector having a definite movement and comprising a group of individually movable members having notches in the edges thereof adapted so that the notches be arranged to form a common groove, said groove varying with movement of any of said members, and means whereby the variation of the groove may be utilized for selectively operating or controlling a subsequently operated mechanism.

3. In an apparatus of the character described, a permutation selector having a definite movement and comprising a group of individually movable members having notches in the edges thereof adapted so that the notches be arranged to form a common groove, said groove varying with movement of either of said members, a plurality of visual indicating units, and means whereby the variation of said groove may be utilized for selectively operating said indicating elements.

4. In an apparatus of the character described, a permutation selector having a definite movement and comprising a group of individually movable members having notches in the edges thereof adapted so that the notches be arranged to form a common groove, said groove varying with movement of either of said members, a pawl adapted to enter the groove, and means whereby entrance of the pawl into said groove will set into operation a subsequently operated mechanism.

5. In an apparatus of the character described, a plurality of visual indicating elements capable of being selectively assembled, a permutation selector comprising a number of parts capable of being arranged various ways to produce different settings of the parts, means whereby the different settings of the selector may be employed for selectively operating the indicating elements, and means for retaining the indicating elements in exhibiting position while the selector is conditioned for a new setting, and mechanical means for setting said selector.

In witness whereof I affix my signature.
HENRY KINGSFORD HARRIS.